United States Patent Office 3,647,724
Patented Mar. 7, 1972

3,647,724
URETHANE FOAMS WITH REDUCED SMOKE LEVELS
Herman P. Doerge, Verona, and Marco Wismer, Gibsonia, Pa., assignors to PPG Industries, Inc., Pittsburgh, Pa.
No Drawing. Filed Nov. 3, 1969, Ser. No. 873,639
Int. Cl. C08g 22/44, 41/00, 51/58
U.S. Cl. 260—2.5 AJ
20 Claims

ABSTRACT OF THE DISCLOSURE

This invention relates to fire retardant polyurethane foams having reduced smoke levels. The invention comprises incorporating chlorendic acid into a fire-retardant foam formulation.

STATE OF THE ART

Increasing attention has been placed on the amount of smoke generated from fire retardant polyurethane foams. It is evident that even a polyurethane foam having a low flame spread may create a hazard if the smoke released when the foam is in contact with the flame is sufficient to trap occupants in an enclosed space by obscuring their vision or hampering their ability to breathe. Methods have been developed for measuring this amount of smoke evolved, for example, see Journal of Cellular Plastics, January, 1967, pages 41–43. Likewise, the Underwriters Laboratory has developed tests and ratings for measuring smoke evolution. (For example, UL–E84 tunnel tests, as well as UL–723.)

DESCRIPTION OF THE INVENTION

It has now been found that chlorendic acid, when incorporated into the phosphorus-containing polyurethane fire retardant foam formulation greatly reduces the amount of smoke generated by the foam without substantially detracting from the foam properties. This is surprising since most acids as a class are either ineffective in reducing smoke generation or significantly degrade foam properties. The amount of chlorendic acid employed in the foams of this invention is that amount which is an effective smoke diminishing amount. Generally about 5 percent to about 40 percent by weight of the total composition is employed. Preferably, about 15 to about 25 percent by weight of the total composition is employed.

The polyurethane foams of this invention having reduced smoke generation are virtually any fire-retardant foam formulation formed by reacting an organic polyisocyanate with an active hydrogen-containing material, and containing a phosphorus fire retardant.

The active hydrogen material may be virtually any active hydrogen-containing material employed as a urethane reactant, such as an organic polyol. Preferably the active hydrogen-containing material is an organic compound or resin having an isocyanate equivalent between about 70 and about 280. The presently preferred groups are polyether polyols having a hydroxyl value between about 200 and about 800, such as the reaction product of a polyhydroxyl compound containing 3 to 8 hydroxyl groups and an alkylene oxide containing 2 to 4 carbon atoms. Most preferably, the polyether polyol consists essentially of carbon, hydrogen and oxygen.

The reactive hydrogen-containing compounds which are conventionally employed in preparing polyurethane foams include as a chief class various long-chain aliphatic polyols, polyether polyol, polyester polyols and the like. Aliphatic polyols useful in this invention include those diols which are separated by a carbon chain of 6 to 20 or more carbon atoms. Since such diols are only difunctional, they are ordinarily included only as minor amounts as a reactant in foam formulations designed to produce the novel rigid foams of this invention. For purposes of this invention, minor amounts of aliphatic diols may be defined as amounts which do not detract from the rigidity of the cured foam nor detract from the excellent dimensional stability of the foam.

Aliphatic triols such as hexanetriol and polyether polyols prepared by the oxyalkylation of said aliphatic triols, may be used in minor or major quantities in the foam formulation of this invention. It is preferred, however, that additional reactive hydrogen components be more than trifunctional and that the trifunctional polyols and polyether polyols be used in relatively minor quantities. The aliphatic triols which may be included as an additional reactive hydrogen component include aliphatic triols having 6 or more carbon atoms. Typical triols include the following: trimethylolethane, trimethylolpropane, glycerol, 1,2,6-hexanetriol and the like. The trifunctional polyether polyols useful in the preparation of rigid polyurethane foams have a hydroxyl number in excess of about 200 and preferably should have a hydroxyl number in excess of about 300.

Tetrafunctional polyether polyols and polyether polyols of higher functionality are prepared by the reaction of an alkylene oxide, such as ethylene oxide, propylene oxide or butylene oxide, with a polyol having 4 or more available hydroxyl groups. Typical tetrafunctional and higher functional polyether polyol are prepared by the oxyalkylation of polyols such as the following: pentaerythritol, sucrose, 2,2,6,6-tetrakis(hydroxymethyl)cyclohexanol, glucose, sorbitol, mannitol, degraded starches, degraded cellulose, diglycerol, $\alpha$-methyl glucoside and the like. When such polyether polyols are utilized in the novel rigid polyurethane foams of this invention, they should have a hydroxyl number in excess of about 200 and preferably in excess of about 250, with the best results ordinarily being achieved from those polyether polyols having hydroxyl numbers in excess of about 300.

In addition to the aliphatic polyols and the polyether polyols, polyester resins containing hydroxyl groups may be utilized to prepare useful rigid polyurethane foams. Suitable polyester resins may be prepared by reacting an excess of polyol with a polycarboxylic acid, especially dicarboxylic acids. Typical polyols include: ethylene glycol; propylene glycol; butylene glycol; glycerol; trimethylolpropane; trimethylolethane; 1,2,6-hexanetriol; pentaerythritol; diethylene glycol; dipropylene glycol; and the like. Typical dicarboxylic acids include: adipic acid, succinic acid, azaleic acid, phthalic acid, isophthalic acid, terephthalic acid, chlorendic acid, tetrabromophthalic acid and the like, and the corresponding anhydrides where such anhydrides exist. Also, long chain dimer acids may be used to form useful polyols by esterification with polyols, especially diols such as ethylene glycol and the like. For the purposes of this invention, useful polyesters should have a minimum hydroxyl number of about 200, and preferably above about 250, with best results being obtained from those polyesters having hydroxyl numbers in excess of about 300.

Another useful class of polyols which can be employed are the trialkanolamines which, by reaction with alkylene oxides, form adducts of suitable molecular weight, and the alkylene oxide adducts thereof. Illustrative of the lower molecular weight trialkanolamines include triethanolamine, triisopropanolamine and tributanolamine. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines and also ammonia. These may be termed aminic polyols.

The mono- and polyamines are preferably reacted with alkylene oxides which have 2 to 4 carbon atoms, for example, ethylene oxide; 1,2-epoxypropane, the epoxybutanes; and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propanediamine, 1,4-butanediamine, 1,2-, 1,3-, 1,4- 1,5- and 1,6-hexanediamine, phenylenediamines, toluenediamine, naphthalenediamines and the like. Among the compounds of the above groups which are of particular interest are, among others, N,N,N',N' - tetrakis(2 - hydroxyethyl)ethylenediamine; N,N,N',N'- - tetrakis(2-hydroxypropyl)ethylenediamine; N,N,N',N' - pentakis(2 - hydroxypropyl)diethylenetriamine; phenyldiisopropanolamine and higher alkylene oxide adducts of aniline, and the like. Others which deserve particular mention are the alkylene oxide adducts of aniline or substituted aniline/formaldehyde condensation products.

Other active hydrogen-containing materials which may be present in the novel urethane foams of this invention include phenol-formaldehyde condensation products, aminic compounds such as diethanolamine, triethanolamine and the like. Another material which may be present in the foams of this invention is castor oil and its derivatives. Also useful are the oxyalkylation products of polyaminepolyamide compounds as obtained by the reaction of dicarboxylic acids with polyamines.

It is obvious that where the active hydrogen compound contains halogens such as chlorine or bromine or nitrogen, since these elements contribute to fire retardancy, a lesser amount of phosphorus compound may be necessary than where the active hydrogen-containing material consists essentially of carbon, hydrogen and oxygen.

Organic polyisocyanates which are reacted with the active hydrogen compounds to form polyurethane foams include the following:

Toluene diisocyanate
Chlorophenyl-2,4-diisocyanate
Ethylene diisocyanate
1,4-tetramethylene diisocyanate
Para-phenylene diisocyanate
Hexamethylene diisocyanate and the like. While the above diisocyanates may be reacted with the active hydrogen-containing material to form foams, it is preferred to form prepolymers of said diisocyanates when they are to be used in rigid foam formulations.

When it is desired to form polyurethane foams directly from an organic polyisocyanate and the active hydrogen-containing materials without first preparing a prepolymer, it is preferred that poly-nuclear polyisocyanates of the following type be included:

Diphenyl diisocyanate
Triphenyl diisocyanate
3,3'-dimethyl-4,4'-biphenylene diisocyanate
3,3'-dimethoxy-4,4'-biphenylene diisocyanate
Polymethylene polyphenyl isocyanate
Diphenylmethane-4,4'-diisocyanate
Triphenylmethane triisocyanate
1,5-naphthalene diisocyanate
3,3'-dimethyldiphenylmethane-4,4'-diisocyanate and the like. Of the preferred polyisocyanates, it has been found that the best results have been obtained when the polymeric polyisocyanates having a functionality greater than 2.0 are utilized. Exemplary polymeric polyisocyanates include the following:

Crude diphenylmethane - 4,4'-diisocyanate, commonly referred to as crude MDI having a functionality of about 2.5 to 2.6. Furthermore, although solid organic polyisocyanates can be utilized in the instant invention by melting them prior to reaction with other foam-forming ingredients, it is preferred that liquid organic polyisocyanates be utilized.

Another organic polyisocyanate particularly useful is crude tolylene diisocyanate, commonly referred to as crude TDI, containing about 85 percent TDI and about 15 percent polymeric isocyanate and having a functionality of about 2.1.

Polymethylene polyphenyl isocyanate, referred to as PAPI, having an isocyanate functionality greater than about 2.4, has been found to be particularly useful.

Polyurethane foams are prepared by reacting approximately one equivalent of active hydrogen-containing resin with one equivalent of an organic polyisocyanate. It is frequently desirable to include a small amount of suitable urethane catalyst and there is also ordinarily included in foam formulations suitable emulsifiers and blowing agents.

The relative amount of organic isocyanate utilized in polyurethane foam formulations is susceptible to variation over a substantial range. Usually the isocyanate component is employed in an amount which provides approximately one reactive isocyanato group for each reactive hydrogen of the other compound, which is conventionally a polyol, polyamine or similar reactive hydrogen-containing material. However, some of the organic polyisocyanates tend to evaporate and it may be desirable to compensate for this loss. A range of about one-half equivalent to about two equivalents of organic polyisocyanate per equivalent of polyol component in the final material is ordinarily used, but smaller or larger amounts can be utilized with good results.

To promote the polyurethane linkage reactions in the final curing of the polyurethane resins, catalysts are usually required. These include tertiary amines of hydroxyl amines, organic salts of tin, and the like. The following constitutes a partial list of such catalysts:

Tetramethylethylenediamine (anhydrous) (TMEDA)
Tetramethyl guanidine (TMG)
Tetramethyl-1,3-butanediamine (TMBDA)
Triethylenediamine of the formula:

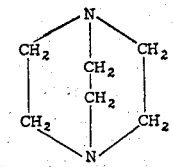

Dimethylethanolamine (DMEA)
Tin esters, such as
    Stannous oleate               Dibutyl tin diluarate
    Stannous octoate           Dibutyl tin diacetate and the like.

Many other catalysts may be substituted for those listed above, if desired. The amount of catalyst used may be in a range of about 0.05 percent to about 5 percent or more by weight based upon the total of the polyols employed. Mixtures of the above and/or other catalysts may also be utilized.

To impart a foamed or cellular structure to the blended polyol-polyisocyanate mixture, a suitable gassing agent or system of gassing agents must be added or produced in situ. The liquid but relatively volatile halocarbons, such as the following perhalocarbons containing 1, 2 or even up to 4 carbon atoms, are especially desirable for the purpose. These include the following.

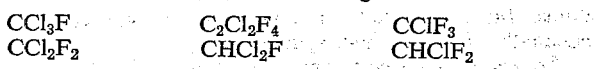

The halocarbons having one and two carbon atoms are preferred, and of these, trichloromonofluoromethane and dichlorodifluoromethane are particularly useful in commercial preparations. These are added as liquids in quantities of about 10 percent or less to about 20 percent or more, by weight of the total resin to the blended polyol-polyisocyanate mixtures, or to one or more components thereof, and are substantially volatilized in the liquid mixture to effect cellulation. Subsequently, the mixture cures to a hardened, cellular state.

Although the halocarbons are especially desirable as blowing agents when exceptional insulative properties are desired, other blowing agents when exceptional insulative properties are desired, other blowing agents, such as water, carbon dioxide, and the like, can be utilized in this invention.

In order to obtain relatively uniform distribution of the various components of the liquid system and to achieve proper cellulation, an emulsifier and/or surfactant may be incorporated into the mixture. These materials are physical in their effect and are not always necessary, especially if denser foams are desired. Many hundreds of these are available as commercial products. Some of these are listed in the publication Detergents and Emulsifiers— Up to Date, published by John W. McCutcheon, Inc., 475 Fifth Avenue, New York, N.Y.

Examples of surfactants which may be used include the so-called Pluronics, which have been described as being condensates of ethylene oxide with a hydrophobic base formed by condensing propylene oxide with propylene glycol. These are of a molecular weight in a range of about 2000 to about 8000 and are ascribed the structure:

$$HO(C_2H_4O)_j(C_3H_6O)_k(C_2H_4O)_lH$$

Another class of surfactants comprises the so-called Tetronics, which are formed by the addition of propylene oxide to ethylene diamine, followed by the addition of ethylene oxide. These compounds have been ascribed the structure:

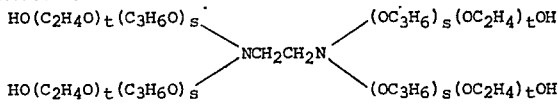

Another valuable class of surfactants comprises the so-called Tweens, which are described as the monoesters of higher fatty acids, represented by lauric acid, stearic acid and oleic acid, and polyoxyethylene sorbitan.

Another of the more satisfactory surfactants which has been found very effectively to maintain the cell structure in the foaming and curing of polyurethane resins comprises soluble, liquid derivatives of the silicones. One such product is of the aproximate structure:

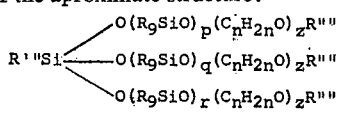

in which R''' and R'''' are monovalent hydrocarbon radicals, while $R_9$ is a divalent hydrocarbon radical; $p$, $q$ and $r$ are integers equal to at least 1 and may be considerably higher, e.g., 2, 3, 4, 5, 6 or a higher number up to about 20; $n$ is a whole number from about 2 to about 4; and $z$ is an integer equal to at least 5 and may be higher, e.g., 6, 7, 8, 9, 10 or even higher, up to about 25. One such material is sold as Dow-Corning 199. Still another highly useful silicon base surfactant comprises the so-called silicon L–52, represented by the following formula:

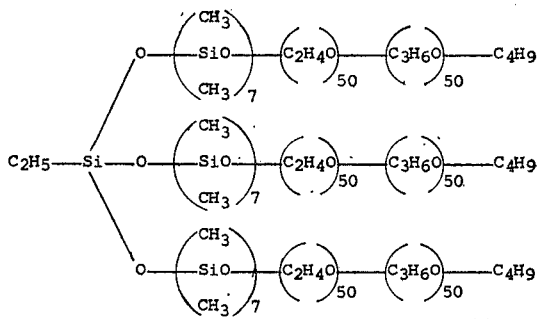

Other surfactants, especially the liquid or soluble nonionic ones, are also useful. The surfactants may be employed in amounts within a range of about 0.1 to about 3 percent by weight based upon the mixture of polyol component and the organic polyisocyanate component. In relatively dense foams, for example, those weighing about 5 or 6 pounds and upward per cubic foot, the surfactants may be omitted entirely.

The foams employed in the composition of this invention are foams which are self-extinguishing under the standards set forth in ASTM D–1962–59T. Generally, the minimum amount of phosphorus is about 0.5 to about 2.0 percent depending on the formulation.

The phosphorus which contributes to fire-retardancy may be in the form of a reactive or a non-reactive phosphorus-containing compound. The reactive phosphorus-containing compound may either be a phosphorus compound containing active hydrogen groups such as a polyol or may be a phosphorus-containing isocyanate. The nature of the phosphrous compound is, in fact, the nature of the active hydrogen compound or the isocyanate generally. It is in no manner critical and all such materials conventionally employed in the art may be employed in the foams of the invention. A great many phosphorus-containing materials which may be incorporated in the polyurethane foams to achieve fire-retardancy are known in the art. These materials can be found, for example, in the U.S. Patent Classification Class 260, subclass 2.5. To enumerate at length all the possible materials is deemed unnecessary since one need merely refer to the art to determine what materials are available. The phosphorus-containing polyols include those derived from phosphorus, phosphonic, phosphoric, and pyrophosphoric acids. The polyols of these acids may be prepared in a number of ways such as reacting the acids with alkylene oxides, or halogen-substituted alkylene oxides or by esterification of the acids or transesterification of acid esters with polyalkylene glycols and polyoxyalkylene glycols. One particularly useful class of polyols is the product of the oxyalkylation of an acid ester formed from oxyacid of phosphorus and a monohydric alcohol described in U.S. Pat. No. 3,407,150. Other polyols which may be employed include diethyl - N,N' - diethanolaminomethyl phosphonate (Fyrol #6), bis(hydroxypolypropoxypropyl) - N,N'-diethanolaminomethyl phosphonate, tris(hydroxypropyl)phosphate, tris[octakis - (2-hydroxypropyl)sucrose]phosphite, tris dipropylene glycol phosphite, tris[tetrakis(2 - hydroxypropyl)α - methyl glycoside]phosphite.

Non-reactive phosphorus fire-retardant agents include tris(chloroethyl)phosphate, tris(chloropropyl)phosphate, tris(2,3 - dichloropropyl)phosphate, tris(2,3 - dibromopropyl)phosphate, bis(beta-chloroethyl)vinyl phosphate.

Phosphorus-containing polyisocyanates include ethylphosphonic diisocyanate, $C_2H_5P(O)(NCO)_2$; phenylphonous diisocyanate, $C_2H_5P(NCO)_2$.

The following examples set forth a presently preferred embodiment. All parts and percentages in the examples as well as throughout the specification are by weight unless otherwise indicated.

The polyol employed in this example was a sucrose polyether polyol as described in U.S. Pat. Nos. 3,085,085; 3,153,002 and 3,222,357 and elsewhere comprising one mole of sucrose, 0.4 mole diethylenetriamine, 14.5 moles of pyropylene oxide and 4 moles of ethylene oxide with an OH of 470.

The isocyanate employed was Mondur-MR, a p,p'-diphenylmethane diisocyanate with a functionality of 2.5 to 2.6 and an NCO equivalent of 133.

The fire-retardant additive was diethyl-N,N'-diethanolaminomethylphosphonate.

The following masterbatch was prepared:

EXAMPLE I

| | Parts by weight |
|---|---|
| Polyol (above) | 1731.0 |
| Fire retardant (above) | 912.0 |
| Silicone surfactant | 30.0 |

EXAMPLE I—Continued

| | Parts by weight |
|---|---|
| Dibutyl tin diacetate | 6.0 |
| Trichloromonofluoromethane | 888.0 |

All the following foams were made by foaming 118.9 parts of the masterbatch with a blend of 100 parts isocyanate with levels of acid at 10 parts, 30 parts and 50 parts. The masterbatch was at 65° F. and the acid isocyanate blend at 77° F. All foamable mixtures were mixed for 10 seconds.

cloth. The samples were covered with an inverted 3¾ inch diameter fritted glass funnel. The funnel walls were 3½ inch deep and the funnel had a ¾ inch diameter throat. The throat of the funnel was connected to a vacuum source. The funnel contains a piece of glass fiber filter placed over the fritted glass.

With vacuum on, the foam samples were burned using a 3½ inch Bunsen burner with the top of the burner 1½ inch below the wire cloth and a flame 3 inches high. The flame was held on the sample for the time indicated. The

TABLE I

| Foam designation | Additive | Level, parts | Cream time, seconds | Set time, seconds | Foam description | Density, lb./cu. ft. |
|---|---|---|---|---|---|---|
| A | Control | | 19 | 45 | Good foam, fine cells | 2.3 |
| B | Chlorendic acid | 10 | 19 | 54 | Tough, good foam; some undissolved material, especially at 50 parts | 2.2 |
| C | do | 30 | 10 | 55 | | 2.6 |
| D | do | 50 | 19 | 87 | | 2.55 |
| E | Oxalic acid | 10 | 42 | 111 | Very low density foams; dark spots in interior of foam | 1.27 |
| F | do | 15 | 51 | 142 | | 1.43 |
| G | do | 30 | 27 | 154 | | 1.37 |
| H | Maleic anhydride | 10 | 31 | 101 | Red foam—heat cracks and large voids in foam | 2.1 |
| I | do | 30 | 34 | 152 | | 2.01 |
| J | do | 50 | 36 | 202 | | 2.1 |
| L | Citric acid | 30 | 19 | 43 | Little undissolved material | 2.82 |
| M | Benzoic acid | 30 | 36 | 111 | Some undissolved material | 2.89 |
| N | Malic acid | 10 | 20 | 47 | Tough foam—some undissolved material | 2.3 |
| O | do | 30 | 19 | 49 | | 2.74 |
| P | do | 50 | 25 | 65 | | 2.8 |
| R | Maleic acid | 10 | 12 | 32 | Brown spots inside, large holes and some heat cracks | 2.1 |
| S | do | 30 | 14 | 42 | | 2.1 |
| T | do | 50 | 9 | 57 | | 1.8 |

Smoke density studies [Reference: Cass, R. A., Journal of Cellular Plastics 3, 1, 41 (1967)] were conducted on the above foams in the following manner:

Cylindrical foam samples, one inch long, 0.765 inch in diameter, were placed on a ¼ inch mesh hardware cloth. foam sample was allowed to flame out. The sample was removed after flameout and placed in a sealed vial. The glass filter was removed and placed in a petri dish. All samples and filters were weighed before and after the test.

The result of the sample burnings were as follows:

TABLE II

| Foam | Additive | Level, parts | Percent weight Remaining | Percent weight Loss | Percent smoke Collected | Percent smoke Average |
|---|---|---|---|---|---|---|
| A | Control | | 16.9 | 83.1 | 14.7 | 12.5 |
| | | | 17.45 | 82.55 | 11.7 | |
| | | | 17.6 | 82.4 | 11.1 | |
| B | Chlorendic acid | 10 | 19.2 | 80.8 | 13.1 | 11.8 |
| | | 10 | 19.1 | 80.9 | 11.3 | |
| | | 10 | 19.2 | 80.8 | 11.1 | |
| C | do | 30 | 26.0 | 74.0 | 9.55 | 8.89 |
| | | 30 | 24.2 | 75.8 | 8.48 | |
| | | 30 | 22.8 | 77.2 | 8.64 | |
| D | do | 50 | 27.4 | 72.6 | 6.44 | 5.66 |
| | | 50 | 32.9 | 67.2 | 3.88 | |
| | | 50 | 27.9 | 22.1 | 6.68 | |
| E | Oxalic acid | 10 | 17.0 | 83.0 | 17.4 | 14.6 |
| | | 10 | 16.3 | 83.7 | 15.2 | |
| | | 10 | 17.1 | 82.9 | 11.3 | |
| F | do | 15 | 15.0 | 85.0 | 12.2 | 10.8 |
| | | 15 | 15.9 | 84.1 | 10.5 | |
| | | 15 | 16.4 | 83.6 | 9.8 | |
| G | do | 30 | 16.25 | 83.75 | 11.15 | 13.3 |
| | | 30 | 16.9 | 83.10 | 10.80 | |
| | | 30 | 17.0 | 83.00 | 17.95 | |
| H | Maleic anhydride | 10 | 22.5 | 77.5 | 7.88 | 6.9 |
| | | 10 | 23.4 | 76.6 | 7.22 | |
| | | 10 | 25.7 | 74.3 | 5.53 | |
| I | do | 30 | 26.8 | 73.2 | 7.27 | 6.4 |
| | | 30 | 27.4 | 72.6 | 6.98 | |
| | | 30 | 29.3 | 70.7 | 5.05 | |
| J | do | 50 | 33.8 | 66.2 | 8.88 | 8.4 |
| | | 50 | 31.0 | 69.0 | 11.75 | |
| | | 50 | 32.8 | 67.2 | 4.58 | |
| L | Citric acid | 30 | 18.9 | 81.1 | 8.50 | 8.9 |
| | | 30 | 18.4 | 81.6 | 9.60 | |
| | | 30 | 19.4 | 80.6 | 8.70 | |
| M | Benzoic acid | 30 | 18.2 | 81.8 | 9.94 | 9.7 |
| | | 30 | 17.2 | 81.8 | 9.06 | |
| | | 30 | 16.2 | 83.8 | 10.15 | |
| N | Malic acid | 10 | 24.5 | 75.5 | 6.85 | 10.2 |
| | | 10 | 19.5 | 80.5 | 12.25 | |
| | | 10 | 18.7 | 81.3 | 11.60 | |
| O | do | 30 | 22.5 | 77.5 | 7.75 | 7.7 |
| | | 30 | 23.2 | 76.8 | 8.07 | |
| | | 30 | 22.9 | 77.1 | 7.18 | |
| P | do | 50 | 34.2 | 65.8 | 4.77 | 5.5 |
| | | 50 | 37.6 | 72.4 | 7.43 | |
| | | 50 | 30.5 | 69.5 | 4.32 | |
| R | Maleic acid | 10 | 19.8 | 80.2 | 16.0 | 13.7 |
| | | 10 | 20.8 | 79.2 | 13.0 | |
| | | 10 | 21.7 | 78.3 | 12.6 | |
| S | do | 30 | 25.9 | 74.1 | 8.31 | 7.6 |
| | | 30 | 27.0 | 73.0 | 5.72 | |
| | | 30 | 25.6 | 74.4 | 8.9 | |
| T | do | 50 | 31.8 | 68.2 | 5.12 | 5.6 |
| | | 50 | 28.3 | 71.7 | 6.15 | |
| | | 50 | 27.6 | 72.4 | 5.65 | |

Other isocyanates, reactive hydrogen materials and phosphorus compounds such as those described hereinabove can be substituted for those of the examples. Likewise, the adjuvants such as cellulating agent, emulsifier, catalyst, etc., may be chosen from those known in the art.

According to the provisions of the patent statutes, there are described above the invention and what are now considered its best embodiments; however, within the scope of the appended claims, it is understood that the invention can be practiced otherwise than as specifically described.

What is claimed is:

1. A polyurethane foam formed by foaming a mixture comprising:
   (A) an organic polyisocyanate;
   (B) an organic polyol;
   (C) a phosphorus-containing fire-retardant organic material in an amount sufficient to render the final foam self-extinguishing;
   (D) a smoke-inhibiting amount of the organic compound chlorendic acid; and
   (E) a cellulating agent.

2. A foam as in claim 1 wherein (B) has an isocyanate equivalent of about 70 to about 280; (C) is a material reactive in the foamable mixture; and (D) is present in an amount of about 5 percent to about 40 percent by weight of the total composition.

3. A foam as in claim 1 wherein (B) comprises a polyether polyol which is the reaction product of a polyhydroxyl compound containing 3 to 8 hydroxyl groups and an alkylene oxide containing 2 to 4 carbon atoms per molecule.

4. A foam as in claim 3 wherein (B) has a hydroxyl value of about 200 to about 800; (C) is a material reactive in the foamable mixture; and (D) is present in an amount of about 5 percent to about 40 percent of the total composition.

5. A foam as in claim 4 wherein the polyol comprises a sucrose polyether polyol.

6. A polyurethane foam as in claim 1 formed from a mixture comprising:
   (A) an organic polyisocyanate;
   (B) an organic polyol having an isocyanate equivalent between about 70 and about 280;
   (C) a phosphorus-containing fire-retardant organic material in an amount sufficient to render the final foam self-extinguishing;
   (D) a smoke-inhibiting amount of the organic compound chlorendic acid;
   (E) a cellulating agent; and
   (F) an emulsifier for the mixture.

7. A foam as in claim 6 wherein (B) comprises a polyether polyol which is the reaction product of a polyhydroxyl compound containing 3 to 8 hydroxyl groups and an alkylene oxide containing 2 to 4 carbon atoms per molecule.

8. A foam as in claim 6 wherein (B) has a hydroxyl value above about 250.

9. A foam as in claim 8 wherein (C) is a material reactive in the foamable mixture.

10. A foam as in claim 8 wherein the polyol comprises a sucrose polyether polyol.

11. A polyurethane foam formed by foaming a mixture comprising:
    (A) an organic polyisocyanate;
    (B) an organic polyol;
    (C) a phosphorus-containing fire-retardant organic material in an amount sufficient to render the final foam self-extinguishing;
    (D) a smoke-inhibiting amount of the organic compound chlorendic acid; and
    (E) a halocarbon blowing agent.

12. A foam as in claim 11 wherein (B) has an isocyanate equivalent of about 70 to about 280; (C) is a material reactive in the foamable mixture and (D) is present in an amount of about 5 percent to about 40 percent by weight of the total composition.

13. A foam as in claim 11 wherein (B) comprises a polyether polyol which is the reaction product of a polyhydroxyl compound containing 3 to 8 hydroxyl groups and an alkylene oxide containing 2 to 4 carbon atoms per molecule.

14. A foam as in claim 13 wherein (B) has a hydroxyl value of about 200 to about 800; (C) is a material reactive in the foamable mixture; and (D) is present in an amount of about 5 percent to about 40 percent of the total composition.

15. A foam as in claim 14 wherein the polyol comprises a sucrose polyether polyol.

16. A polyurethane foam as in claim 11 formed from a mixture comprising:
    (A) an organic polyisocyanate;
    (B) an organic polyol having an isocyanate equivalent between about 70 and about 280;
    (C) a phosphorus-containing fire-retardant organic material in an amount sufficient to render the final foam self-extinguishing;
    (D) a smoke-inhibiting amount of the organic compound chlorendc acid;
    (E) a hydrocarbon blowng agent; and
    (F) an emulsifier for the mixture.

17. A foam as in claim 16 wherein (B) comprises a polyether polyol wihch is the reaction product of a polyhydroxyl compound containing 3 to 8 hydroxyl groups and an alkylene oxide containing 2 to 4 carbon atoms per molecule.

18. A foam as in claim 16 wherein (B) has a hydroxyl value above about 250.

19. A foam as in claim 18 wherein (C) is a material reactive in the foamable mixture.

20. A foam as in claim 18 wherein the polyol comprises a sucrose polyether polyol.

References Cited

UNITED STATES PATENTS 3,249,562  5/1966  Schoepfle _____ 260—2.5
3,214,394  10/1965  Schoepfle _____ 260—2.5

DONALD E. CZAJA, Primary Examiner

W. IVY, Assistant Examiner

U.S. Cl. X.R.

260—2.5 AM, 2.5 AS, 2.5 AR